D. G. WILLIAMS.
Improvement in Butter-Molds.

No. 125,644.                                    Patented April 9, 1872.

WITNESSES.                                      INVENTOR.

125,644

UNITED STATES PATENT OFFICE.

DANIEL G. WILLIAMS, OF QUINCY, MICHIGAN.

IMPROVEMENT IN BUTTER-MOLDS.

Specification forming part of Letters Patent No. 125,644, dated April 9, 1872.

*To all whom it may concern:*

Be it known that DANIEL G. WILLIAMS, of Quincy, in the county of Branch and State of Michigan, has invented a new and valuable Improvement in Butter Press and Stamp; and he does hereby declare that the following is a full, clear, and exact description of the construction and operation of the same, reference being had to the annexed drawing making a part of this specification, and to the letters and figures of reference marked thereon.

Figure 1:
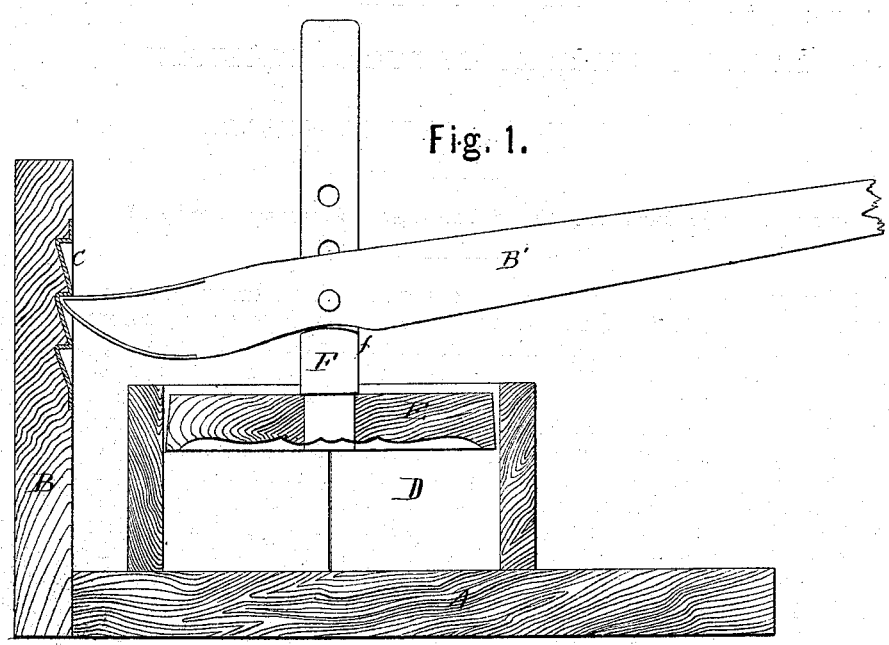
Figure 2:
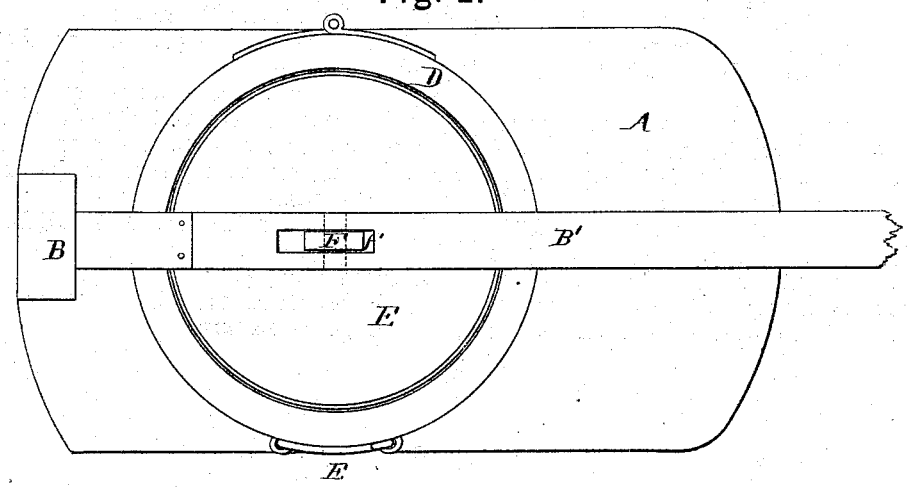

Figure 1 of the drawing is a representation of a longitudinal transverse section of my invention. Fig. 2 is a top plan view of the same.

This invention has relation to butter-presses; and consists in constructing the drum in two semicircular halves, hinged together, and capable of removal from the press-stand, and in the construction and novel arrangement of the press-lever, substantially as hereinafter described.

In the drawing, A is a horizontal press-stand, at one end of which is a post, B, notched at C to hold the end of the adjustable press-lever B′, moved from one to the other of the notches, according to the quantity of butter to be molded. The notches are beveled, and so also is the end of the lever, which makes the adjustment more convenient. If made of wood, the notches and end of the lever should be covered with metal to prevent wear. D represents the press-drum, constructed in two semicircular halves, hinged together, and fastened, when required, by a latch-fastening, E. The drum rests on the base A, but may be removed therefrom. E indicates the press-plunger, made plain or figured on its under surface, and adapted to fit and move within the press-drum. The plunger is provided with a stem, F, which is shouldered at $f$, and passes through a slot, $f'$, in the lever, to which it is pivoted.

The butter is placed in the drum and pressed until all the superfluous moisture is expelled, after which the drum is opened and the butter removed. The butter will then appear in a print form, and be ready for market or table use.

What I claim as my invention, and desire to secure by Letters Patent, is—

The butter-press, consisting of the base-board A, notched post B, lever B′, pivoted plunger E, and drum D, made in two halves, hinged together, substantially as specified.

In testimony that I claim the above I have hereunto subscribed my name in the presence of two witnesses.

DANIEL G. WILLIAMS.

Witnesses:
A. M. MOFFITT,
E. H. WILLIAMS.